(12) United States Patent
Schmitz et al.

(10) Patent No.: US 7,194,241 B2
(45) Date of Patent: Mar. 20, 2007

(54) EFFICIENT MULTIPLE-BAND ANTENNA SWITCHING CIRCUIT

(75) Inventors: Norbert A. Schmitz, Salem, NH (US); Mark N. Ayvazian, Wilmington, MA (US); Philip H. Thompson, Solon, IA (US); Edward F. Lawrence, Marion, IA (US); Darryl E. Evans, Nashua, NH (US); David M. Johnson, Wilmington, MA (US)

(73) Assignee: Skyworks Solutions, Inc., Irvine, CA (US)

( * ) Notice: Subject to any disclaimer, the term of this patent is extended or adjusted under 35 U.S.C. 154(b) by 530 days.

(21) Appl. No.: 10/729,028

(22) Filed: Dec. 4, 2003

(65) Prior Publication Data

US 2005/0124301 A1  Jun. 9, 2005

(51) Int. Cl.
*H04B 1/44* (2006.01)

(52) U.S. Cl. .............................. 455/83; 455/82; 455/78; 455/83; 455/552.1; 455/575.7; 333/103; 333/133; 333/126; 370/280

(58) Field of Classification Search ................ 455/78, 455/82, 84, 83, 575, 132, 272, 552.1; 370/280, 370/276; 333/101, 103, 133, 126
See application file for complete search history.

(56) References Cited

U.S. PATENT DOCUMENTS

| | | | | |
|---|---|---|---|---|
| 5,768,691 | A * | 6/1998 | Matero et al. | 455/78 |
| 5,881,369 | A * | 3/1999 | Dean et al. | 455/78 |
| 6,081,694 | A * | 6/2000 | Matsuura et al. | 455/78 |
| 6,115,585 | A * | 9/2000 | Matero et al. | 455/78 |
| 6,185,434 | B1 * | 2/2001 | Hagstrom et al. | 455/552.1 |
| 6,442,376 | B1 * | 8/2002 | Furutani et al. | 455/82 |
| 6,560,443 | B1 * | 5/2003 | Vaisanen et al. | 455/73 |
| 6,856,213 | B2 * | 2/2005 | Tsurunari et al. | 333/133 |
| 7,049,906 | B2 * | 5/2006 | Wilcox | 333/126 |

* cited by examiner

*Primary Examiner*—Marceau Milord
(74) *Attorney, Agent, or Firm*—Farjami & Farjami LLP

(57) ABSTRACT

An exemplary antenna switching circuit comprises first, second, third and fourth switches. The first switch is activated by a first control signal for establishing a connection between a first transmit port and an antenna; the second switch is activated by a second control signal for establishing a connection between a second transmit port and the antenna; the third switch is activated by a third control signal for establishing a connection between a first receive port and the antenna; and the fourth switch is activated by the third control signal for establishing a connection between a second receive port and the antenna. With this arrangement, the first receive port and the second receive port are simultaneously connected to the antenna when the third switch and the fourth switch are activated by the third control signal.

17 Claims, 2 Drawing Sheets

EFFICIENT MULTIPLE-BAND ANTENNA SWITCHING CIRCUIT

BACKGROUND OF THE INVENTION

1. Field of the Invention

The present invention is generally in the field of semiconductors. More specifically, the invention is in the field of semiconductor circuits.

2. Related Art

Mobile phones employing the Global System for Mobile Communication ("GSM") standard are typically capable of operating in multiple frequency bands. For example, tri-band and quad-band GSM mobile phones are capable of operating in three frequency bands and four frequency bands, respectively, thereby allowing the mobile phone to be used with a variety of service providers, each of which employ a different frequency band.

Current tri-band and quad-band GSM mobile phones have five or six transmit and receive ports, respectively, tied to a common antenna. Each of these ports typically has at least one and sometimes two control lines per port. In the case of a tri-band GSM mobile phone, for example, five or six control lines are typically required in order provide the antenna switching function for its five transmit and receive ports. For the quad-band GSM mobile phone, six or seven control lines are typically required in order provide the antenna switching function for its six transmit and receive ports.

Presently, however, GSM mobile phone chips provide only three or four control lines for the antenna switching function. Conventionally, decoders are used by known antenna switching circuits to reduce the number of control lines from six or seven lines to three or four lines for interfacing with the GSM mobile phone chip. Such decoders, however, occupy significant device area and undesirably increase device size and manufacturing cost. Moreover, the lines which route signals to and from the decoder further consume additional device area and further increase device size and manufacturing cost.

Another disadvantage associated with known antenna switching circuits is the significant DC (battery) current consumed even during standby or "all-off" mode due to the current drawn by known switching circuits through bias resistors connected to the battery. For example, even during standby mode, known antenna switching circuits consume between approximately 10 to 100 microamperes at all times, which is undesirable.

Accordingly, there is a strong need in the art for an efficient multiple-band antenna switching circuit.

SUMMARY OF THE INVENTION

The present invention is directed to an efficient multiple-band antenna switching circuit. In one exemplary embodiment, an antenna switching circuit is capable of coupling a plurality of ports to an antenna, and the antenna switching circuit comprises first, second, third and fourth switches. The first switch is activated by a first control signal for establishing a connection between a first transmit port and the antenna; the second switch is activated by a second control signal for establishing a connection between a second transmit port and the antenna; the third switch is activated by a third control signal for establishing a connection between a first receive port and the antenna; and the fourth switch is activated by the third control signal for establishing a connection between a second receive port and the antenna. With this arrangement, the first receive port and the second receive port are simultaneously connected to the antenna when the third switch and the fourth switch are activated by the third control signal.

According to another embodiment of the invention, the antenna switching circuit further comprises a fifth switch and a sixth switch such that the fifth switch is activated by a fourth control signal for establishing a connection between a third receive port and the antenna, and the sixth switch is activated by the fourth control signal for establishing a connection between a fourth receive port and the antenna. According to this particular embodiment, the third receive port and the fourth receive port are simultaneously connected to the antenna when the fifth switch and the sixth switch are activated by the fourth control signal.

According to another embodiment of the invention, the antenna switching circuit further comprises a bias resistor connected across the first transmit port and the second transmit port. According to this particular embodiment, the bias resistor supplies a pull-up bias to an inactive one of the first switch and the second switch.

According to another embodiment of the invention, the first receive port receives low band signals, and the second receive port receives high band signals. According to yet another embodiment of the invention, the first transmit port transmits high band signals, and the second transmit port transmits low band signals. For example, the low band signals may be configured in accordance with one of an 850 megahertz GSM band and a 900 megahertz GSM band, and the high band signals may be configured in accordance with one of an 1800 megahertz GSM band and a 1900 megahertz GSM band.

According to various embodiment of the present invention, antenna switching for multiple-band applications, such as tri-band and quad-band applications, is provided by the antenna switching circuit of the present invention without the need for a decoder, resulting in significant savings in device area consumption and manufacturing cost, while additionally reducing DC (battery) current consumption.

Other features and advantages of the present invention will become more readily apparent to those of ordinary skill in the art after reviewing the following detailed description and accompanying drawings.

DETAILED DESCRIPTION OF THE INVENTION

The present invention is directed to an efficient multiple-band antenna switching circuit. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed description are directed to merely exemplary embodiments of the invention. To maintain brevity, other embodiments of the invention which use the principles of the present invention are not specifically described in the present application and are not specifically illustrated by the present drawings.

Figure 1A:
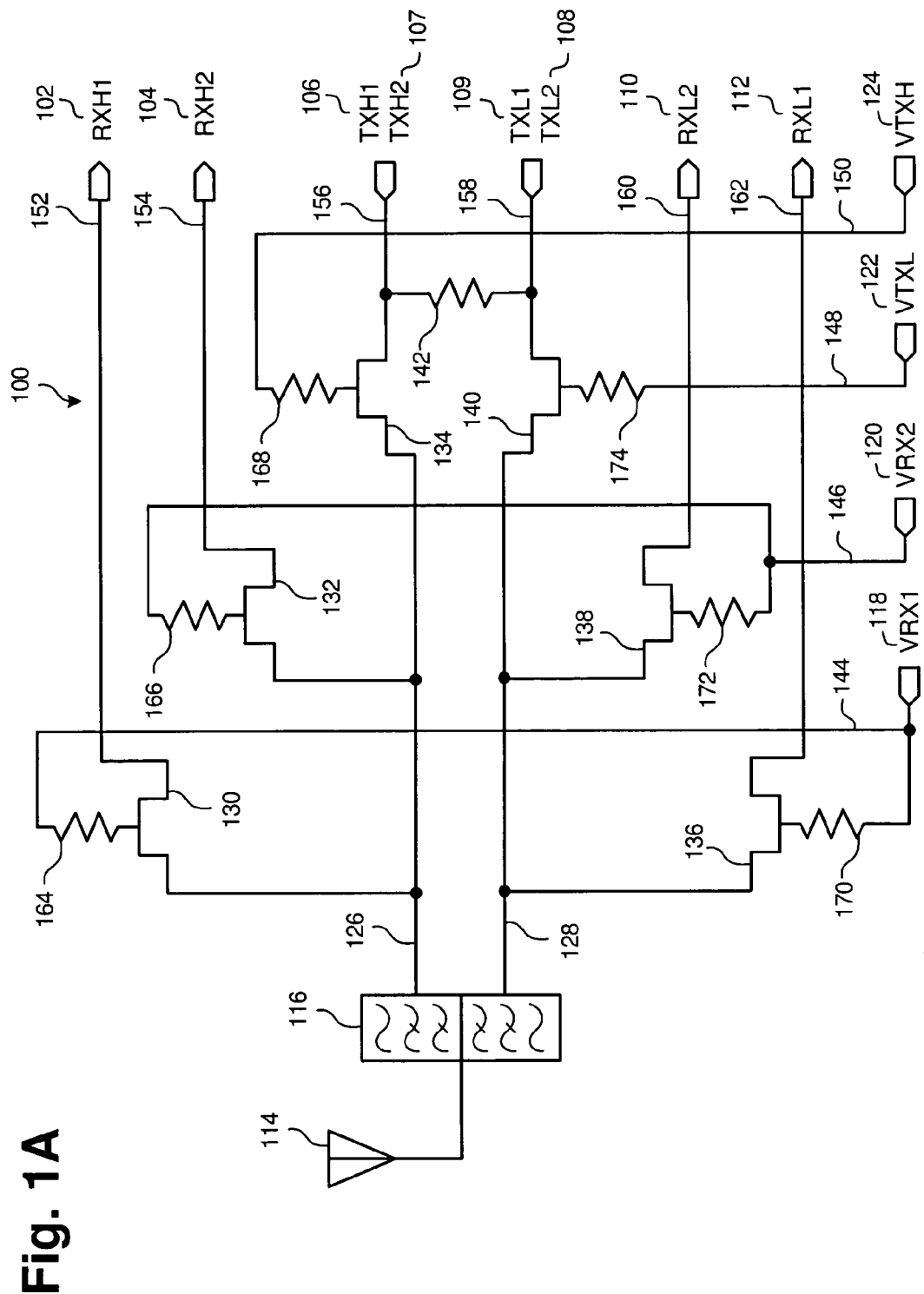
FIG. 1A shows a circuit diagram of an exemplary multiple-band antenna switching circuit according to one embodiment of the present invention.

Referring to FIG. 1A, there is shown a circuit diagram depicting exemplary antenna switching circuit 100 according to one embodiment of the present invention. Antenna switching circuit 100 may, for example, be integrated onto a single semiconductor die for use in a mobile phone. Antenna switching circuit 100 may, in certain embodiments, be integrated into a transmit module, which itself may include additional functionality, such as a power amplifier, for example. Also discussed below, due to the particular arrangement of antenna switching circuit 100, antenna switching for multiple-band applications, such as tri-band and quad-band applications, is provided by antenna switching circuit 100 without the need for a decoder, resulting in significant savings in device area consumption and manufacturing cost. Furthermore, antenna switching circuit 100 achieves these advantages while significantly reducing current consumption, resulting in improved operating efficiency.

As shown in FIG. 1A, antenna switching circuit 100 is coupled to antenna 114 via diplexer 116. Antenna switching circuit 100 is configured to connect and disconnect a plurality of ports to and from antenna 114 in accordance with control signals received via control ports 144, 146, 148 and 150, as discussed more fully below.

In the particular embodiment shown in FIG. 1A, switching circuit 100 is configured to support quad-band operation and comprises four receive ports and two transmit ports. For example, receive port 152 is capable of communicating first receive high band signal ("RXH1") 102; receive port 154 is capable of communicating second receive high band signal ("RXH2") 104; transmit port 156 is capable of communicating first transmit high band signal ("TXH1") 106 and second transmit high band signal ("TXH2") 107; transmit port 158 is capable of communicating first transmit low band signal ("TXL1") 109 and second transmit low band signal ("TXL2") 108; receive port 162 is capable of communicating first receive low band signal ("RXL1") 112; and receive port 160 is capable of communicating second receive low band signal ("RXL2") 110. By way of illustration, RXH1 102 and TXH1 106 may be signals configured in accordance with the 1800 megahertz ("MHz") GSM band; RXH2 104 and TXH2 107 may be signals configured in accordance with the 1900 MHz GSM band; RXL2 110 and TXL2 108 may be signals configured in accordance with the 850 MHz GSM band; and RXL1 112 and TXL1 109 may be signals configured in accordance with the 900 MHz GSM band.

Continuing with FIG. 1A, antenna switching circuit 100 comprises field-effect transistors ("FETs") 130, 132, 134, 136, 138 and 140 and resistors 164, 166, 168, 170, 172, 174 and 142. Antenna switching circuit 100 further comprises control ports 144, 146, 148 and 150. Control port 144 is configured to receive first receive control signal ("VRX1") 118, and is connected to the gate of FET 130 through resistor 164 and to the gate of FET 136 through resistor 170. A first source or drain ("S/D") terminal of FET 130 is coupled to receive port 152, and a second S/D terminal of FET 130 is coupled to first diplexer line 126. Similarly, a first S/D terminal of FET 136 is coupled to receive port 162, and a second S/D terminal of FET 136 is coupled to second diplexer line 128.

Control port 146 is configured to receive second receive control signal ("VRX2") 120, and is connected to the gate of FET 132 through resistor 166 and to the gate of FET 138 through resistor 172. A first S/D terminal of FET 132 is coupled to receive port 154, and a second S/D terminal of FET 132 is coupled to first diplexer line 126. A first S/D terminal of FET 138 is coupled to receive port 160, and a second S/D terminal of FET 138 is coupled to second diplexer line 128.

Control port 148 is configured to receive accept low band control signal ("VTXL") 122, and is connected to the gate of FET 140 through resistor 174. A first S/D terminal of FET 140 is coupled to transmit port 158, and a second S/D terminal of FET 140 is coupled to second diplexer line 128. Control port 150 is configured to accept transmit high band control signal ("VTXH") 124, and is connected to the gate of FET 134 through resistor 168. A first S/D terminal of FET 134 is coupled to transmit port 156, and a second S/D terminal of FET 134 is coupled to first diplexer line 126. Resistor 142 is connected across transmit ports 156 and 158.

In the exemplary embodiment shown in FIG. 1A, control signals VRX1 118, VRX2 120, VTXL 122 and VTXH 124 may be generated by a processor, such as a mobile phone chip, for controlling the FETs 130, 132, 134, 136, 138 and 140 and, more particularly, for controlling the connections between ports 152, 154, 156, 158, 160 and 162 and antenna 114 via diplexer 116. As shown in FIG. 1A, antenna switching circuit 100 only requires four control ports 144, 146, 148 and 150. Antenna switching circuit 100 achieves this arrangement, among other things, by employing a single control port, e.g., control port 144, to enable a connection between antenna 114 and at least one receive port for high band signals, e.g., receive port 152, and at least one receive port for low band signals, e.g., receive port 162, at the same time. Since the diplexer is capable of splitting and isolating high and low band signals, coupling receive port 152 for high band signals and receive port 162 for low band signals to diplexer 116 via first diplexer line 126 and second diplexer line 128, respectively, does not adversely affect reception performance. In a similar manner, control port 146 enables a connection between antenna 114 and a second receive port for high band signals, e.g., receive port 154, and a second receive port for low band signals, e.g., receive port 160, at the same time. Thus, only two control ports 144 and 146 are required by antenna switching circuit 100 for selection of one of four receive bands. The present invention's concept to reduce the number of control lines can also be applied to dual-band and tri-band GSM as well as five-band configurations that include Universal Mobile Telecommunications System ("UMTS") bands.

To illustrate the operation of antenna switching circuit 100 according to one embodiment of the invention, reference is now made to Table 1, which shows exemplary function modes of antenna switching circuit 100 based on control signals VRX1 118, VRX2 120, VTXL 122 and VTXH 124 received via control ports 144, 146, 148 and 150, respectively.

TABLE 1

| Function | VRX1 | VRX2 | VTXL | VTXH |
|---|---|---|---|---|
| Standby | 0 | 0 | 0 | 0 |
| GSM 1800 or 1900 transmit | 0 | 0 | 0 | 1 |
| GSM 850 or 900 transmit | 0 | 0 | 1 | 0 |
| GSM 850 or 1900 receive | 0 | 1 | 0 | 0 |
| GSM 900 or 1800 receive | 1 | 0 | 0 | 0 |

As shown in Table 1, standby mode is enabled when VRX1 118, VRX2 120, VTXL 122 and VTXH 124 are all zero (0) or "low." In this mode, no current is drawn by antenna switching circuit 100. In this mode, the mobile phone is not operating so the current drain is the only relevant operating parameter.

In GSM 1800 or 1900 transmit mode, antenna switching circuit 100 enables the transmission of both high band signals TXH1 106 and TXH2 107 via transmit port 156. In this mode, VTXH 124 is one (1) or "high," activating FET 134 and connecting transmit port 156 to first diplexer line 126 and to antenna 114. Also during GSM 1800 or 1900 transmit mode, VRX1 118, VRX2 120 and VTXL 122 are low, thereby shutting off FETs 130 and 132 and disconnecting receive ports 152 and 154 from antenna 114. Furthermore, since resistor 142 is connected across transmit ports 156 and 158, resistor 142 operates as a pull-up bias resistor along with the logic low signals of VRX1 118, VRX2 120, and VTXL 122 to inactivate FETs 136, 138, and 140 and disconnect receive ports 160 and 162 and transmit port 158 from antenna 114. This prevents any stray signals present on transmit port 158 from reaching the antenna during GSM 1800 or 1900 transmit mode. Resistor 142 can, for example, be 20–30 KiloOhms (kΩ).

In GSM 850 or 900 transmit mode, antenna switching circuit 100 enables the transmission of both low band signals TXL1 109 and TXL2 108 via transmit port 158. In this mode, VTXL 122 is high, activating FET 140 and connecting transmit port 158 to second diplexer line 128 and to antenna 114. Also during GSM 850 or 900 transmit mode, VRX1 118, VRX2 120 and VTXH 124 are low, thereby shutting off FETs 136 and 138 and disconnecting receive ports 160 and 162 from antenna 114. In this mode, resistor 142 operates as a pull-up bias resistor along with the logic low signals of VRX1 118, VRX2 120, and VTXH 124 to inactivate FETs 130, 132, and 135 and disconnect receive ports 152 and 154 and transmit port 156 from antenna 114. This prevents any stray signals present on transmit port 156 from reaching the antenna during GSM 850 or 900 transmit mode.

In GSM 850 or 1900 receive mode, antenna switching circuit 100 enables the reception of both high band signals RXH2 104 and low band signals RXL2 110 via receive ports 154 and 160, respectively. In this mode VRX2 120 is high, activating FETs 132 and 138, and connecting receive port 154 to first diplexer line 126 and to antenna 114, and further connecting receive port 160 to second diplexer line 128 and to antenna 114. Also during GSM 850 or 1900 receive mode, VRX1 118, VTXL 122 and VTXH 124 are low, thereby shutting off FETs 130, 134, 136 and 140, and disconnecting receive ports 152 and 162 and transmit ports 156 and 158 from antenna 114.

In GSM 900 or 1800 receive mode, antenna switching circuit 100 enables the reception of both high band signals RXH1 102 and low band signals RXL1 112 via receive ports 152 and 162, respectively. In this mode VRX1 118 is high, activating FETs 130 and 136, and connecting receive port 152 to first diplexer line 126 and to antenna 114, and further connecting receive port 162 to second diplexer line 128 and to antenna 114. Also during GSM 900 or 1800 receive mode, VRX2 120, VTXL 122 and VTXH 124 are low, thereby shutting off FETs 132, 134, 138 and 140, and disconnecting receive ports 154 and 160 and transmit ports 156 and 158 from antenna 114.

Due to the unique arrangement of antenna switching circuit 100 combined with diplexer 116, only two control ports 144 and 146 are required for selection of one of four receive bands, and only two control ports 148 and 150 are required for selection of one of four transmit bands. Thus, only four control ports, i.e., control ports 144, 146, 148 and 150, are required in order to provide switching for receive ports 152, 154, 160 and 162 and transmit ports 156 and 158. Advantageously, a decoder is not required by antenna switching circuit 100 to provide the above-discussed switching functionality since control lines for the receive ports are paired together to enable reception of at least one high band frequency with at least one low band frequency. It is further noted that the specific assignments for receive bands may be arbitrarily selected provided one high band frequency is paired with one low band frequency, as described above in conjunction with Table 1. For odd-number band configurations, there is always one unpaired receive path, but the benefit of reducing the number of control lines is maintained. As a benefit of the arrangement of antenna switching circuit 100 which does not require a decoder and its associated route lines, device area consumption, device size, and manufacturing cost are substantially reduced. Moreover as discussed above, current consumption by antenna switching circuit 100 is significantly reduced over prior antenna switching circuits.

Figure 1B:
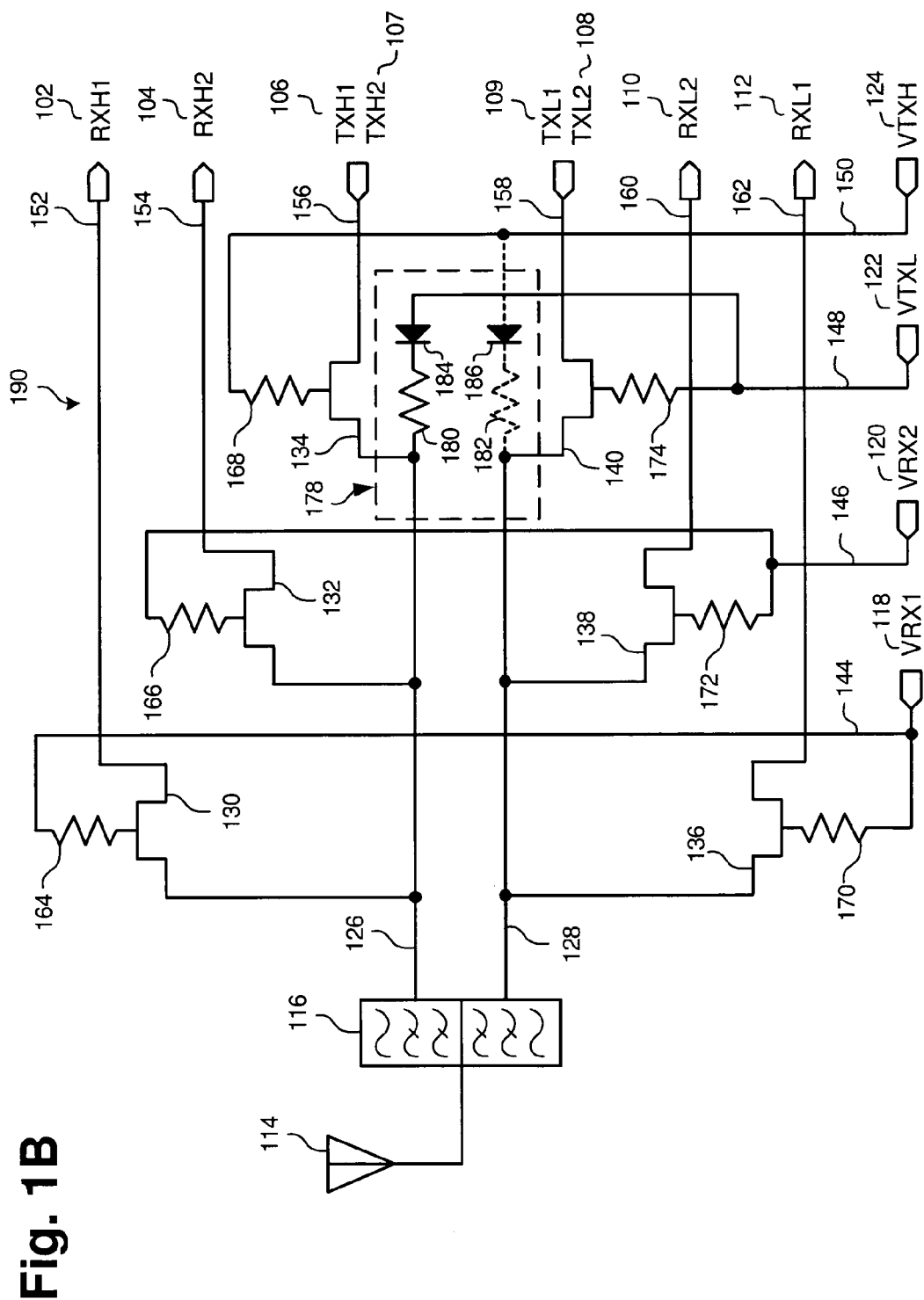
FIG. 1B shows a circuit diagram of an exemplary multiple-band antenna switching circuit according to another embodiment of the present invention.

Referring to FIG. 1B, there is shown a circuit diagram depicting exemplary antenna switching circuit 190 according to another embodiment of the present invention, wherein like references in antenna switching circuit 190 of FIG. 1B and in antenna switching circuit 100 of FIG. 1A indicate similar elements.

Antenna switching circuit 190 of FIG. 1B operates substantially as antenna switching circuit 100 of FIG. 1A, as described above; however, resistor 142 of antenna switching circuit 100 in FIG. 1A has been removed from antenna switching circuit 190 of FIG. 1B, and bias circuit 178 has been added. Bias circuit 178 comprises resistors 180 and 182 and diodes 184 and 186. Resistor 182 and diode 186 are optional. In one embodiment, resistor 182 and diode 186 are not used. The cathode of diode 184 is connected through resistor 180 to first diplexer line 126, and the anode of diode 184 is connected to control port 148. The cathode of diode 186 is connected through resistor 182 to second diplexer line 128, and the anode of diode 186 is connected to control port 150. In this arrangement, bias circuit 178 provides the requisite pull-up bias during transmit mode, wherein one of FETs 140 and 134 is active while the other of FETs 140 and 134 is inactive.

For example, during GSM 1800 or 1900 transmit mode, as discussed above in conjunction with Table 1, VTXH 124 is high activating FET 134, and VRX1 118, VRX2 120 and VTXL 122 are low, shutting off FETS 130, 132, 136, 138 and 140. The voltage supplied by VTXH 124 is also connected across resistor 182 and diode 186 to supply the requisite pull-up bias to inactive FET 140. Furthermore, during receive mode, such as GSM 900 or 1800 receive mode shown in Table 1, VRX1 118 is high activating FETs 130 and 136, and VRX2 120, VTXL 122 and VTXH 124 are low, shutting off FETs 132, 134, 138 and 140. During this mode, diodes 184 and 186 prevent current from flowing to the low voltages at control ports 148 and 150, preventing excessive current consumption during receive mode operation.

From the above description of exemplary embodiments of the invention it is manifest that various techniques can be used for implementing the concepts of the present invention without departing from its scope. Moreover, while the invention has been described with specific reference to certain embodiments, a person of ordinary skill in the art would recognize that changes could be made in form and detail without departing from the spirit and the scope of the invention. The described exemplary embodiments are to be considered in all respects as illustrative and not restrictive. It should also be understood that the invention is not limited to the particular exemplary embodiments described herein, but is capable of many rearrangements, modifications, and substitutions without departing from the scope of the invention.

Thus, an efficient multiple-band antenna switching circuit has been described.

The invention claimed is:

1. An antenna switching circuit capable of coupling a plurality of ports to an antenna, said antenna switching circuit comprising:
   a first switch activated by a first control signal for establishing a connection between a first transmit port and said antenna;
   a second switch activated by a second control signal for establishing a connection between a second transmit port and said antenna;
   a third switch activated by a third control signal for establishing a connection between a first receive port and said antenna;
   a fourth switch activated by said third control signal for establishing a connection between a second receive port and said antenna, wherein said first receive port and said second receive port are simultaneously connected to said antenna when said third switch and said fourth switch are activated by said third control signal;
   a fifth switch activated by a fourth control signal for establishing a connection between a third receive port and said antenna;
   a sixth switch activated by said fourth control signal for establishing a connection between a fourth receive port and said antenna, wherein said third receive port and said fourth receive port are simultaneously connected to said antenna when said fifth switch and said sixth switch are activated by said fourth control signal.

2. The antenna switching circuit of claim 1 further comprising a bias resistor connected across said first transmit port and said second transmit port.

3. The antenna switching circuit of claim 1 wherein said first receive port receives low band signals.

4. The antenna switching circuit of claim 1 wherein said second receive port receives high band signals.

5. The antenna switching circuit of claim 1 wherein said first transmit port transmits high band signals.

6. The antenna switching circuit of claim 1 wherein said second transmit port transmits low band signals.

7. A transmit module for a mobile phone device, said transmit module coupled to an antenna, said transmit module comprising an antenna switching circuit, said antenna switching circuit comprising:
   a first switch activated by a first control signal for establishing a connection between a first transmit port and said antenna;
   a second switch activated by a second control signal for establishing a connection between a second transmit port and said antenna;
   a third switch activated by a third control signal for establishing a connection between a first receive port and said antenna;
   a fourth switch activated by said third control signal for establishing a connection between a second receive port and said antenna, wherein said first receive port and said second receive port are simultaneously connected to said antenna when said third switch and said fourth switch are activated by said third control signal;
   a fifth switch activated by a fourth control signal for establishing a connection between a third receive port and said antenna;
   a sixth switch activated by said fourth control signal for establishing a connection between a fourth receive port and said antenna, wherein said third receive port and said fourth receive port are simultaneously connected to said antenna when said fifth switch and said sixth switch are activated by said fourth control signal.

8. The transmit module of claim 7 further comprising a bias resistor connected across said first transmit port and said second transmit port.

9. The transmit module of claim 7 wherein said first receive port receives low band signals and wherein said second receive port receives high band signals.

10. The transmit module of claim 9 wherein said low band signals are configured in accordance with one of an 850 megahertz GSM band and a 900 megahertz GSM band, and wherein said high band signals are configured in accordance with one of an 1800 megahertz GSM band and a 1900 megahertz GSM band.

11. The transmit module of claim 7 wherein said first transmit port transmits high band signals, and wherein said second transmit port transmits low band signals.

12. The antenna switching circuit of claim 11 wherein said low band signals are configured in accordance with one of an 850 megahertz GSM band and a 900 megahertz GSM band, and wherein said high band signals are configured in accordance with one of an 1800 megahertz GSM band and a 1900 megahertz GSM band.

13. An antenna switching circuit capable of coupling a plurality of ports to an antenna, said antenna switching circuit comprising:
   a first switch activated by a first control signal for establishing a connection between a first transmit port and said antenna;
   a second switch activated by a second control signal for establishing a connection between a second transmit port and said antenna;
   a third switch activated by a third control signal for establishing a connection between a first receive port and said antenna;
   a fourth switch activated by said third control signal for establishing a connection between a second receive port and said antenna, wherein said first receive port and said second receive port are simultaneously connected to said antenna when said third switch and said fourth switch are activated by said third control signal
   a first control port coupled to a gate of said first switch, said first control port being configured to receive said first control signal;
   a second control port coupled to a gate of said second switch, said second control port being configured to receive said second control signal;
   a fifth switch activated by a fourth control signal for establishing a connection between a third receive port and said antenna;
   a sixth switch activated by said fourth control signal for establishing a connection between a fourth receive port and said antenna, wherein said third receive port and said fourth receive port are simultaneously connected to said antenna when said fifth switch and said sixth switch are activated by said fourth control signal.

14. The antenna switching circuit of claim 13 further comprising a diode having an anode and a cathode, said anode of said diode being coupled to said first control port and said cathode of said diode being coupled to said antenna.

15. The antenna switching circuit of claim 13 further comprising a diode having an anode and a cathode, said anode of said diode being coupled to said second control port and said cathode of said diode being coupled to said antenna.

16. The antenna switching circuit of claim 13 wherein said first receive port receives low band signals and wherein said second receive port receives high band signals.

17. The antenna switching circuit of claim 13 wherein said first transmit port transmits high band signals, and wherein said second transmit port transmits low band signals.

* * * * *